(12) United States Patent
Ogasawara et al.

(10) Patent No.: US 8,926,763 B2
(45) Date of Patent: *Jan. 6, 2015

(54) METHOD FOR CLEANING INTERNAL PARTS OF GASOLINE ENGINES

(75) Inventors: Yasuhiro Ogasawara, Omaezaki (JP); Toshio Anami, Omaezaki (JP); Yuuki Katoh, Omaezaki (JP)

(73) Assignee: Chevron Japan Ltd., San Ramon, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 12/122,564

(22) Filed: May 16, 2008

(65) Prior Publication Data

US 2008/0283098 A1    Nov. 20, 2008

(30) Foreign Application Priority Data

May 17, 2007   (JP) ................. 2007-131689

(51) Int. Cl.
| | |
|---|---|
| *B08B 9/02* | (2006.01) |
| *F02B 77/04* | (2006.01) |
| *F02M 25/00* | (2006.01) |
| *F02M 35/10* | (2006.01) |
| *F02M 35/112* | (2006.01) |
| *F02M 35/116* | (2006.01) |

(52) U.S. Cl.
CPC ............... *F02B 77/04* (2013.01); *F02M 25/00* (2013.01); *F02M 35/10242* (2013.01); *F02M 35/112* (2013.01); *F02M 35/116* (2013.01); *Y02T 10/146* (2013.01)
USPC ...... 134/22.1; 134/21; 134/22.12; 134/22.18; 134/37

(58) Field of Classification Search
USPC .......... 134/21, 22.1, 22.12, 22.18, 37, 39, 40, 134/42; 123/198 A
See application file for complete search history.

(56) References Cited

U.S. PATENT DOCUMENTS

| | | | | |
|---|---|---|---|---|
| 3,774,399 | A | * 11/1973 | Nohira et al. | .................. 60/278 |
| 4,125,092 | A | * 11/1978 | Inamura | ..................... 123/25 B |
| 4,671,230 | A | 6/1987 | Turnipseed | |
| 4,784,170 | A | 11/1988 | Romanelli et al. | |
| 4,800,848 | A | 1/1989 | Hubbard | |
| 4,807,578 | A | 2/1989 | Adams et al. | |
| 4,881,945 | A | 11/1989 | Buckley, III | |
| 4,989,561 | A | 2/1991 | Hein et al. | |
| 4,992,187 | A | 2/1991 | Adams et al. | |
| 5,097,806 | A | 3/1992 | Vataru et al. | |
| 5,257,604 | A | 11/1993 | Vataru et al. | |

(Continued)

FOREIGN PATENT DOCUMENTS

| | | |
|---|---|---|
| EP | 1 122 295 A1 | 8/2001 |
| JP | 61-38120 A | 2/1986 |

(Continued)

*Primary Examiner* — Michael Kornakov
*Assistant Examiner* — Ryan Coleman

(57) ABSTRACT

Interior parts of gasoline engines are readily cleaned by a method comprising the steps of connecting an a cleaning liquid supply pipe having a gas supply port thereon airtightly to a port of an intake pipe of the engine below a throttle valve-attached position of the engine; operating the engine to draw cleaning liquid in the form of liquid drop and simultaneously drawing continuously a gas having an oxygen concentration of less than 20 vol. % into the intake pipe; and exhausting the cleaning liquid having been brought into contact with the internal parts of the engine with an exhaust gas.

7 Claims, 5 Drawing Sheets

(56) References Cited

U.S. PATENT DOCUMENTS

| | | |
|---|---|---|
| 5,452,696 A | 9/1995 | Flynn |
| 5,503,683 A | 4/1996 | Butcher et al. |
| 5,669,939 A | 9/1997 | Cherpeck |
| 5,749,929 A | 5/1998 | Cherpeck et al. |
| 5,858,942 A | 1/1999 | Adams et al. |
| 5,970,994 A * | 10/1999 | Sasaki et al. ............... 134/102.1 |
| 6,073,638 A | 6/2000 | Sasaki et al. |
| 6,178,977 B1 * | 1/2001 | Wells .......................... 134/102.1 |
| 6,192,901 B1 | 2/2001 | Rome et al. |
| 6,203,584 B1 | 3/2001 | Fuentes-Afflick et al. |
| 6,217,621 B1 | 4/2001 | Modebelu et al. |
| 6,478,036 B1 | 11/2002 | Connors et al. |
| 2002/0067072 A1 * | 6/2002 | Mizutani et al. ........... 303/114.3 |
| 2002/0107161 A1 | 8/2002 | Gatzke |
| 2006/0167613 A1 * | 7/2006 | Barba et al. ................... 701/108 |

FOREIGN PATENT DOCUMENTS

| | | |
|---|---|---|
| JP | 2001-355520 A | 12/2001 |
| JP | 2001355520 A * | 12/2001 |
| WO | WO 90/10051 | 9/1990 |
| WO | WO 92/07176 | 4/1992 |
| WO | WO 00/33981 | 6/2000 |

* cited by examiner

METHOD FOR CLEANING INTERNAL PARTS OF GASOLINE ENGINES

FIELD OF INVENTION

The present invention relates to a method for cleaning internal parts of gasoline engines.

BACKGROUND OF INVENTION

It has been known that hydrocarbon material and the like derived from gasoline or engine oil is deposited on internal parts of a gasoline engine so that the accelerating power of the engine decreases and the fuel economy decreases. Therefore, a detergent is added to the gasoline to remove the deposit. However, the addition of a detergent to gasoline is typically not enough for effectively removing the deposit. Therefore, the engine is generally disassembled at predetermined intervals and the internal parts of the engine are cleaned.

WO 03/062626 A1, discloses an apparatus for supplying a detergent liquid (a detergent composition) for removing deposit from the internal parts of engines. The apparatus is equipped with a treatment manifold having ports (orifices) for supplying the detergent liquid. In the use of the apparatus, the pipes of the manifold are inserted in the engine through the intake pipe so that the detergent liquid is supplied into positions in the vicinity of the deposits. Therefore, the deposits particularly formed on the intake valves of the engine are efficiently removed. The publication further discloses that nozzles can be attached to the ports of the pipes of the manifold so that the detergent liquid can be sprayed into the engine.

The apparatus disclosed in the WO 03/062626 A1 can efficiently remove deposits formed on the internal parts of an engine. However, it is not easy to adjust the number of the manifold pipes and their shapes in consideration of the structure of the engine to be cleaned so as to facilitate the operation for inserting the pipes of the manifold deeply in the intake pipe so that the ports of the pipes can be placed in the engine in the vicinity of the deposits. Further, the operation for placing the ports of the pipes of the manifold in the engine in the vicinity of the deposits can be performed only by those having enough experiences and skill.

Accordingly, it is an object of the invention to provide an easily operable method for clearing the internal parts of gasoline engines.

SUMMARY

The present invention resides in a method for cleaning internal parts of a gasoline engine which comprises the steps of:

(1) connecting an outlet of a cleaning liquid supply pipe of a cleaning liquid storage tank containing a cleaning liquid airtightly to a port of an intake pipe of the gasoline engine, said cleaning liquid supply pipe having the outlet at its front end and a gas supply port thereon, said intake pipe having the port or a branch pipe having the port below a throttle valve-attached position thereof;

(2) operating the engine to place the inside of the intake pipe under reduced pressure condition and supplying continuously the cleaning liquid from the cleaning liquid storage tank to the inside of the intake pipe through the outlet of the cleaning liquid supply pipe in the form of liquid drop and simultaneously drawing continuously a gas having an oxygen concentration of less than 20 volume percent into the intake pipe via the gas supply port, whereby carrying the liquid drops with the gas into the inside of the engine to bring the liquid drops of the cleaning liquid into contact with the internal parts of the engine, wherein cleaning the internal parts with the cleaning liquid; and (3) exhausting the cleaning liquid having been brought into contact with the internal parts of the engine with an exhaust gas of the engine.

Particular aspects of the invention are further described below.

1) The branch pipe having a port is a canister purge hose, a brake booster hose, a blow-by hose, a negative pressure sensor hose, a hose for fuel pressure-adjusting device, a variable intake valve-operating negative pressure hose, an exhaust gas recirculation-operating hose, or a swirler control valve-operating hose.

2) The gas having an oxygen concentration of less than 20 volume percent contains an exhaust gas from an exhaust pipe of the engine.

3) The exhaust gas has been filtered to remove particulate

4) The cleaning method is performed with the engine mounted to a car.

DETAILED DESCRIPTION

Figure 1:
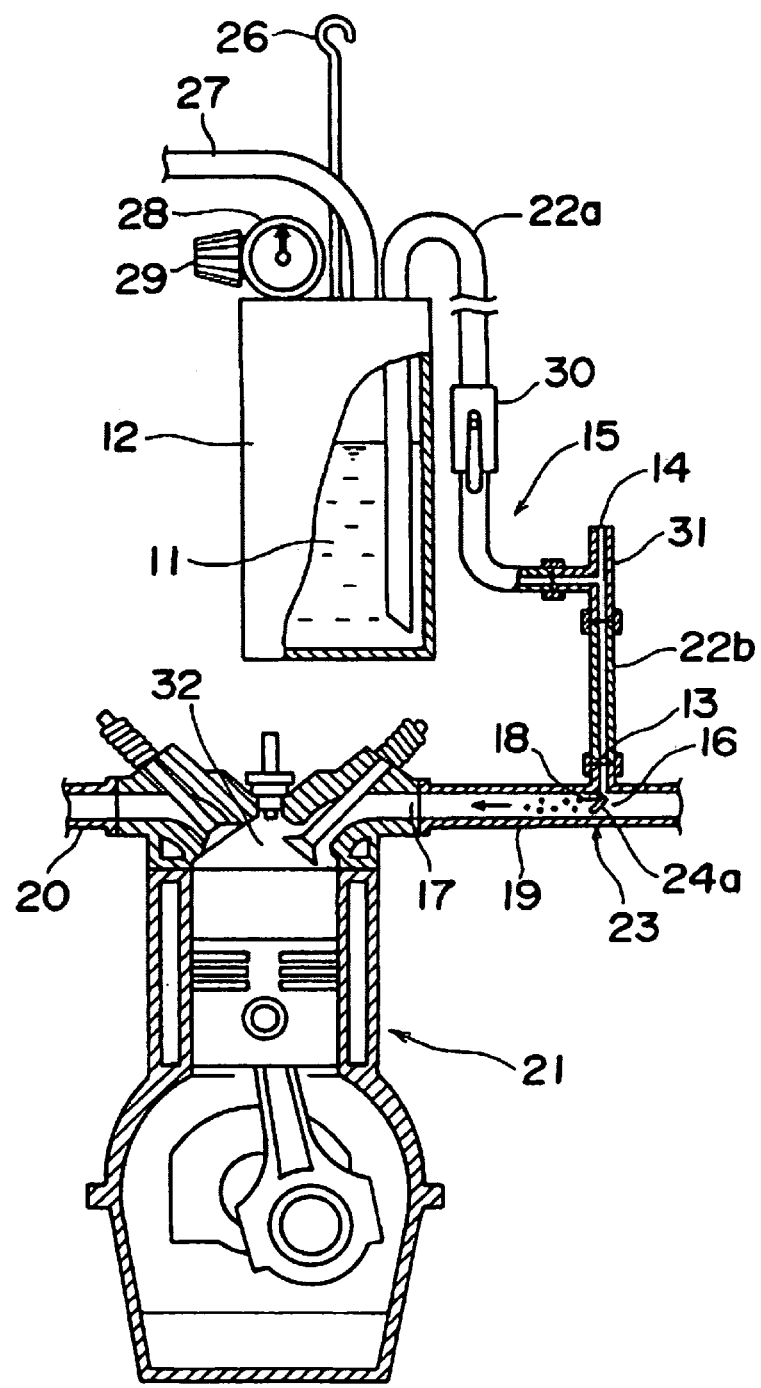
FIG. 1 schematically illustrates an apparatus favorably employable for performing the cleaning method of the invention and the gasoline engine to be cleaned.

In the specification, the following terms are defined as set forth below.

The term "throttle valve-attached position" means any position from the center position of the throttle valve to the position of the opposite end (opposite to the position of the engine) of the throttle plate observed when the throttle valve is fully opened.

The term "internal parts of the engine" means not only the inner surface of the engine but also various parts (e.g., intake valves) attached to the engine.

The term "intake pipe has the port or a branch pipe having the port below a throttle valve-attached position thereof" means that the intake pipe has the port (and/or a branch pipe having the port) for introducing the cleaning liquid into the intake pipe between the throttle valve-attached position and the below side end at which the intake pipe is connected to the engine.

The terms "supplying continuously the cleaning liquid from the cleaning liquid storage tank to the inside of the intake pipe", and "supplying continuously a gas having an oxygen concentration of less than 20 volume percent into the intake pipe" mean that the cleaning liquid and gas are supplied into the intake pipe under reduced pressure at every time when the engine under operation repeats the intake of an air.

The reference numbers used in FIGS. 1-5 are described herein as: 11: cleaning liquid, 12': cleaning liquid storage tank, 13: cleaning liquid outlet, 14: gas supply port, 15: cleaning liquid supply pipe, 16: throttle valve-attached position, 17: intake port, 18: port, 19: intake pipe, 20: exhaust pipe, 21: gasoline engine, 22a: main pipe, 22b: connection tube, 23: throttle valve, 24a: throttle plate, 24b: throttle plate, 26: hook, 27: gas supply pipe, 28: pressure gauge, 29: pressure control valve, 30: valve, 31: branched pipe, 32: combustion chamber, 33: car, 34: bonnet hood, 35: exhaust gas cleaning apparatus, 36: tail pipe, 37: resinous hose, 38: filter, 39: catalyst apparatus, 40: exhaust gas treatment apparatus, 41: duct, 42: fan, 50: gasoline engine, 51, 52, 53, 54, 55, 56: cylinder, 51a: intake port, 51b: intake valve, 58: port, 59: intake pipe.

According to the cleaning method of the invention, the internal parts of the engine can be cleaned with very simple procedures comprising the steps of connecting an outlet of a cleaning liquid supply pipe of a cleaning liquid storage tank to a port of an intake pipe of the engine, supplying continuously the cleaning liquid and a gas (such as an exhaust gas of the engine of the car) having an oxygen concentration of less than 20 volume percent into the intake pipe under reduced pressure simultaneously. Thus, it is not necessary for the cleaning method of the invention to modify the structure of the manifold in consideration of the structure of the engine and to deeply insert the liquid-supplying manifold pipes in the intake pipe so that the positions of the liquid-supplying manifold pipes are appropriately adjusted in the intake pipe. Further, the cleaning method of the invention is easily performed under such condition that the engine is mounted in the car, that is, without necessity of disassembling the engine and dismounting the engine from the car.

The method of the invention for cleaning internal parts of a gasoline engine is further described with reference to the attached drawings. FIG. 1 schematically shows an apparatus favorably employable for performing the cleaning method of the invention and a gasoline engine to be subjected to the cleaning method.

The cleaning method of the invention can be performed by carrying out the following steps (1) to (3) sequentially:

(1) connecting an outlet 13 of a cleaning liquid supply pipe 15 of a cleaning liquid storage tank 12 containing a cleaning liquid 11 airtightly to a port 18 of an intake pipe 19 of the gasoline engine 21, said cleaning liquid supply pipe 15 having the outlet 13 at its front end and a gas supply port 14 thereon and said intake pipe 19 having the port 18 below a throttle valve-attached position thereof 16;

(2) operating the engine 21 to place the inside of the intake pipe 19 under reduced condition, whereby supplying continuously the cleaning liquid 11 from the cleaning liquid storage tank 12 to the inside of the intake pipe 19 through the outlet 13 of the cleaning liquid supply pipe 15 in the form of liquid drop and simultaneously supplying continuously a gas having an oxygen concentration of less than 20 volume percent into the intake pipe 19, wherein carrying the liquid drops with the gas into the inside of the engine 21 to bring the liquid drops of the cleaning liquid into contact with the internal parts of the engine 21, whereby cleaning the internal parts with the cleaning liquid; and (3) exhausting the cleaning liquid having been brought into contact with the internal parts of the engine with an exhaust gas of the engine 21.

Representative examples of the gasoline engine to be cleaned include port fuel injection spark ignition-type engines (PFI SI engines) and direct injection spark ignition-type engines (DISI engines). According to the cleaning method of the invention, the cleaning liquid as well as the gas having an oxygen concentration of less than 20 vol. % (hereinafter, referred to as "cleaning liquid, etc.") are continuously supplied into the inside of the intake pipe through a port of the intake pipe (including one or more ports of a branch pipe attached to the intake pipe, which are hereinafter described in more detail).

The port 18 of the intake pipe 19 is a port formed in the area below the throttle valve-attached position (on the side near to the intake port 17 of the engine 21) which can be a port for drawing gasoline vapor into the intake pipe for burning the gasoline vapor generated in a fuel tank in the engine, that is a port for canister purge. Otherwise, a port for introducing the cleaning liquid, etc. into the inside of the intake pipe can be formed.

In the cleaning procedure for the gasoline engine 21 in FIG. 1, the port 18 for supplying the cleaning liquid, etc., into the inside of the intake pipe 19 is a port for canister purge which is formed in the intake pipe 19.

Figure 2:
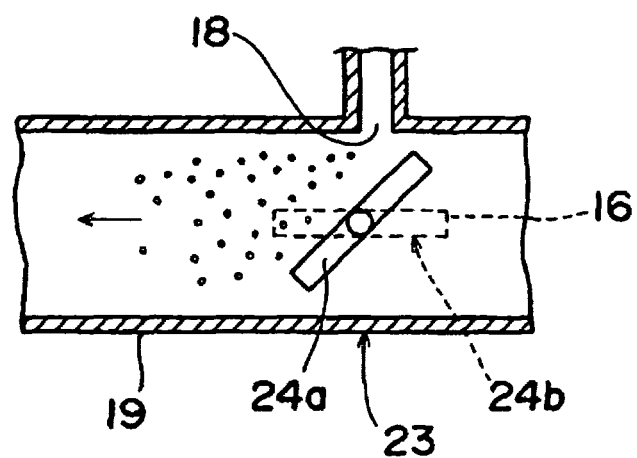
FIG. 2 is an enlarged view of the area in the vicinity of the throttle valve 23 of the intake pipe 19 shown in FIG. 1.

As is described hereinbefore, the term of "throttle valve-attached position" means any position from the center position of the throttle valve to the position of the opposite end (opposite to the position of the engine) of the throttle plate observed when the throttle valve is fully opened. For instance, the throttle valve 23 attached to the intake pipe 19 is made fully open when the throttle plate 24a is arranged along the center axis of the intake pipe 19. In more detail, as is seen in FIG. 2 illustrating an enlarged figure of the intake pipe 19, the throttle plate 24b takes a position shown by a dotted frame. The throttle valve-attached position 16 includes the position of the right end of the dotted frame of the throttle plate 24b (end of the dotted frame opposite to the side of the engine 21).

In FIG. 1, the inside of the intake pipe 19 in the area between the intake port 17 of the engine 21 and the throttle valve-attached position 16 is placed under a reduced pressure condition when the engine is operated. That is because, when the engine 21 is operated, the engine 21 sucks air through the intake port 17 in the intake stroke, while the throttle plate 24a in the intake pipe 19 disturbs the suction of air partly.

To the port 18 of the intake pipe 19 is airtightly connected the cleaning liquid outlet 13 of the cleaning liquid supply pipe 15. The airtight connection between the port 18 of the intake pipe 19 and the cleaning liquid outlet 13 does not always mean that the connection is made in a strictly airtight manner. For instance, both can be connected to each other by means of a known resinous connection hose.

The cleaning liquid storage tank 12 can be made of metallic material such as iron, aluminum or stainless steel or resinous material. The hook 26 attached to the top of the cleaning liquid storage tank 12 can be used for pending the tank 12 at an appropriate position (for instance, at a lower surface of a bonnet hood of a car).

The cleaning liquid supply pipe 15 can be a flexible tube made of resinous material such as rubber, vinyl chloride resin or fluorine resin or a rigid pipe made of metallic material such as iron, aluminum or stainless steel.

The cleaning liquid 11 can be a known cleaning liquid for gasoline engines. The cleaning liquid can be chosen in consideration of the nature and amount of the deposit formed on the internal engine parts, workability of cleaning procedures and safety of cleaning procedures. A typical cleaning liquid is a cleaning liquid (cleaning composition) disclosed in the aforementioned WO 03/062626 A1. This cleaning liquid comprises a first solution comprising a mixture of a nitrogen-containing detergent additive and a specific organic solvent and a second solution comprising a mixture of a cyclic carbonate, a specific organic solvent and water. If the cleaning liquid comprises two cleaning solutions, the first cleaning solution and the second cleaning solution can be mixed and then charged into the cleaning liquid storage tank for supplying the mixture onto the internal parts of the engine. Otherwise, one cleaning solution (e.g., first cleaning solution) is first charged into the storage tank and the charged cleaning solution is then used for cleaning the internal parts of the engine, and subsequently another cleaning solution (e.g., second cleaning solution) is charged into the storage tank and the charged cleaning solution is then used for cleaning the internal parts of the engine.

The cleaning liquid 11 is supplied into the cleaning liquid supply pipe 15 by pressurizing the internal space of the storage tank 12 by introducing a gas (e.g., air or nitrogen gas) into the storage tank 12 through the gas supply tube 27. The cleaning liquid 11 is then supplied continuously into the intake pipe 19 under reduced pressure through the cleaning liquid outlet 13. The cleaning liquid storage tank 12 is equipped with a pressure gauge 28 for checking the pressure of the introduced gas and a pressure control valve 29 for controlling the pressure. The rate of the cleaning liquid 11 supplied into the intake pipe 19 can be adjusted to a predetermined rate by controlling the inner pressure of the storage tank 12. The supply of the cleaning liquid can be started or stopped by means of a valve 30 attached to the cleaning liquid supply pipe 15. Otherwise, the cleaning liquid can be supplied continuously by introducing into the intake pipe under reduced pressure through the port of the intake pipe without introducing a gas into the storage tank.

The cleaning liquid 11 can be warmed and then supplied into the intake pipe 19. For instance, when the cleaning of engines is carried out in winter, the viscous cleaning liquid turns into large liquid drops in the intake pipe. If the cleaning liquid 11 is warmed under such conditions to turn less viscous and then supplied into the intake pipe 19, the cleaning liquid 11 gives liquid drops of small sizes in the intake pipe. The cleaning liquid 11 can be warmed by a heater which can be attached to the cleaning liquid storage tank 12 or the cleaning liquid supply pipe 15 (or a branch pipe attached to the intake pipe which will be described hereinafter).

According to the cleaning method of the invention, the cleaning liquid is supplied into the intake pipe 19 together with a gas containing less than 20 vol. % of oxygen (preferably an exhaust gas of the car engine). When the cleaning liquid and the gas containing less than 20 vol. % of oxygen are together introduced into the intake pipe 19 under reduced pressure, the gas rapidly expands and the cleaning liquid turns into small sized liquid drops (in the form of mist) in the intake pipe 19. The small sized liquid drops are then carried with the gas in the intake pipe 19 to reach and contact a wide variety of internal parts of the engine 21. Accordingly, the wide variety of the internal parts can be efficiently cleaned. The oxygen contained in the gas introduced into the intake pipe 19 can serve to burn the gasoline as well as the organic material contained in the cleaning liquid in the combustion chamber 32. Thus, a portion of the cleaning liquid used for cleaning the internal parts is burned and exhausted from the engine through the exhaust pipe 20 together with the unburned cleaning liquid as well as the burned gasoline.

If the cleaning method of the invention is utilized, there is no need of employing the manifold pipe having a structure fitted to an engine to be cleaned and carefully arranging the manifold pipe in the intake pipe of the engine. According to the cleaning method of the invention, the cleaning of internal parts of an engine can be carried out by very simple procedures including connecting the cleaning liquid outlet of the cleaning liquid supply tube to a port of the intake pipe of the engine (or a port formed on a branch pipe attached to the intake pipe, which will be described hereinafter), and supplying the cleaning liquid and a gas containing less than 20 vol. % of oxygen into the intake pipe under reduced pressure through the supply pipe.

In the cleaning method of the invention, the gas containing less than 20 vol. % of oxygen supplied into the intake pipe together with the cleaning liquid can serve to produce small sized drops of the cleaning liquid in the intake pipe and further serve to carry the small sized liquid drops to reach a wide variety of internal parts of the engine. In the cleaning method of the invention, the gas containing less than 20 vol. % of oxygen is used for the below-described reasons.

While a gas containing 20 vol. % or more of oxygen is supplied into the gas supply port 14 of the cleaning liquid supply pipe 15, the cleaning liquid can be turned into small sized liquid drops and the liquid drops can be carried to reach a wide variety of internal parts of the engine. In other words, satisfactory cleaning of internal parts of an engine can be performed using either a gas containing 20 vol. % or more oxygen or a gas containing less than 20 vol. % of oxygen. However, if the gas supplied into the intake pipe together with the cleaning liquid contains a large volume of oxygen (20 vol. % or more), the air-fuel ratio in the engine increases to produce an oxygen-rich condition, possibly resulting in increase of an amount of nitrogen oxides ($NO_x$) contained in the exhaust gas. If the oxygen content in the supplied gas is low (such as less than 20 vol. %), the engine can be cleaned with an exhaust gas containing a less amount of nitrogen oxides ($NO_x$).

In the invention, the oxygen content in the gas to be supplied into the intake pipe is preferably less than 15 vol. %, more preferably less than 10 vol. %. Thus, the gas contains oxygen as small as possible. Examples of the gas containing less than 20 vol. % of oxygen include inert gases such as nitrogen gas, argon gas and a mixture of the inert gas and an oxygen-containing gas (e.g., oxygen gas or air). An exhaust gas (which generally contains less than 1 vol. % of oxygen) produced in the engine of the car can be preferably employed. The exhaust gas is generally warm, and hence can serve to warm the cleaning liquid to turn into a liquid with a low viscosity even when the cleaning procedure is performed at a low temperature, and small sized drops of the cleaning liquid are produced in the intake pipe.

The gas containing less than 20 vol. % of oxygen can be supplied to the gas supply port of the cleaning liquid supply tube using a pump. Otherwise, the gas can be drawn into the intake pipe under reduced pressure from the gas supply port of the cleaning liquid supply pipe.

As is shown in FIG. 1, the cleaning liquid supply pipe 15 preferably comprises a main pipe 22a for taking the cleaning liquid 11 out of the storage tank 12 and a connection pipe 22b being connected to the intake pipe 19 and having an opening at the top (top opposite to the side of the intake pipe 19), which are a branched pipe 31. If the supply pipe has this structure, the cleaning liquid supply pipe 15 having a gas supply port 14 (the opening of the branched pipe 31) can be provided by a simple procedure of connecting the main pipe 22a and the connection pipe 22b though the branched pipe 31. Further, if the supply pipe has the above-mentioned structure, the cleaning liquid and the gas containing less than 20 vol. % of oxygen are well mixed in the connection pipe 22b and supplied under the well mixed condition into the intake pipe 19. Therefore, the cleaning liquid is converted into small sized liquid drops under expansion of the gas and introduced into the intake pipe 19. The liquid drops are then carried by the gas to move to a wide variety of the internal parts of the engine.

If a branch pipe arranged to the intake pipe 19 at the position lower than the throttle valve attached position 16 is used in place of the connection tube 22b, there is no need of providing a connection tube to the cleaning liquid supply tube. Examples of the branch pipes include a canister purge hose, a blow-by hose, an exhaust gas circulation-operating hose, a brake booster hose, a swirler control valve-operating hose, a negative pressure sensor hose, a hose for fuel pressure-adjusting device, and a variable intake valve-operating negative pressure hose. These hoses are connected to the intake pipe at the ports arranged in the positions lower than the throttle valve position and during engine operation the ports are at a differential pressure. These differential pressures are useful: for drawing a gas (e.g., gasoline vapor) which should not be exhausted as such into air, but drawn into the intake pipe for burning the gas in the engine; for driving other apparatuses or assisting the drive of other apparatuses utilizing negative pressure produced in the intake pipe under reduced pressure; or for connecting to a pressure gauge for measuring the pressure of the inside of the intake pipe.

For instance, the canister purge hose is provided for drawing the gasoline vapor (which is produced in a fuel tank) into the intake pipe under reduced pressure so as to burn the gasoline vapor in the engine. The blow-by hose is provided to the intake pipe for drawing the blow-by gas (i.e., gasoline vapor escaped into the crank case from the combustion chamber of the engine) into the intake pipe under reduced pressure. The exhaust gas circulation-operating hose is provided to the intake pipe for drawing a portion of the exhaust gas containing nitrogen oxides into the intake pipe under reduced pressure so as to reduce the content of the nitrogen oxides in the exhaust gas. The brake booster hose is provided to the intake pipe for connecting the intake pipe to a brake booster apparatus so as to multiply the brake power using the negative pressure produced in the intake pipe. The negative pressure sensor hose is provided to the intake pipe for connecting the intake pipe to a negative pressure sensor so as to measure the pressure in the intake pipe.

If any one of the above-mentioned hoses is utilized, there is no need of specifically providing the connection tube 22b for constituting the cleaning liquid supply pipe 15 and newly forming a port for supplying the cleaning liquid and gas into the intake pipe 19 when the cleaning method of the invention is performed.

When the cleaning method of the invention is performed, the cleaning liquid and a gas containing less than 20 vol. % of oxygen are together supplied continuously into the intake pipe under reduced pressure while the engine is operated. It is known that the piston and driving parts of the engine may be damaged if a large amount of the cleaning liquid not in the form of liquid drops is present in the combustion chamber during the compression stroke. According to the cleaning method of the invention, the cleaning liquid is supplied into the intake pipe in the form of small sized liquid drops together with a gaseous carrier. Therefore, the engine can be smoothly operated even if the cleaning liquid is continuously supplied.

The cleaning procedure according to the cleaning method of the invention can be preferably performed for 5 to 90 minutes, more preferably 10 to 40 minutes, but the period for the cleaning procedure may depend on the type of the engine and the nature and amount of the deposit accumulated in the engines. The above-mentioned period of time is the period for supplying the cleaning liquid into the intake pipe. The amount of the cleaning liquid to be supplied into the intake pipe preferably ranges 100 to 1,500 mL (in total), more preferably 100 to 1,000 mL. The cleaning liquid is preferably supplied into the intake pipe at a rate of 2 to 80 mL/min., more preferably 5 to 50 mL/min.

As is understood from the above-mentioned description, the cleaning method of the invention is advantageous in practice for cleaning internal parts of the engine, because the cleaning can be performed without dismounting the engine from the car and modifying the connection conditions of the intake pipe.

Figure 3:
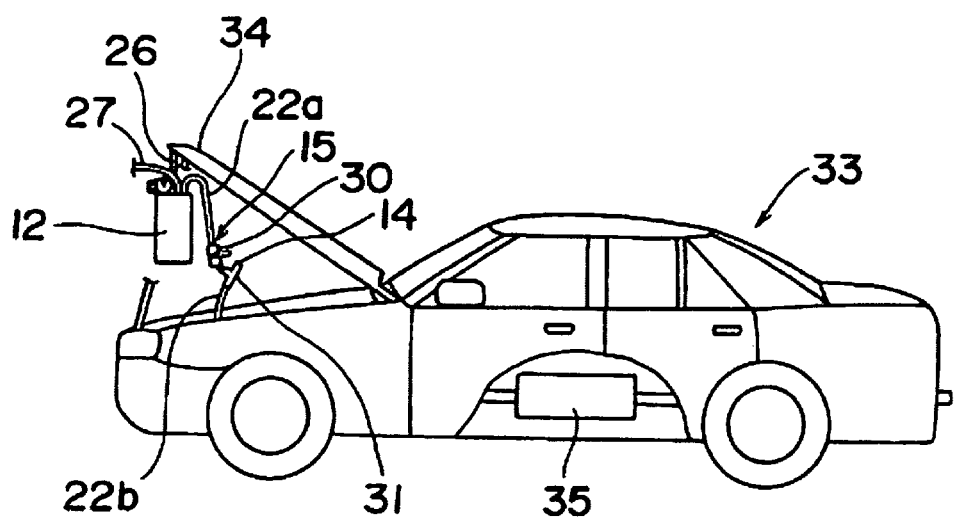
FIG. 3 illustrates an embodiment in which the cleaning method of the invention is performed for an engine mounted to a car.

FIG. 3 illustrates an embodiment of the invention in which the cleaning method is performed under such condition that the engine is mounted to a car 33. As is seen from FIG. 3, the cleaning method of the invention can be performed with the engine mounted to the car 33 by hanging the cleaning liquid storage tank 12 from a bonnet hood 34 using a hook 26 attached to the top of the storage tank 12, thereby smoothly supplying the cleaning liquid into the intake pipe.

Also as is seen from FIG. 3, the gas supply port 14 of the cleaning liquid supply pipe 15 can be connected to the rear end of the tail pipe 36 of the car 33 via a resinous hose 37, so that the exhaust gas (gas containing less than 20 vol. % of oxygen) can be supplied into the intake pipe. If the exhaust gas is utilized as the gas containing less than 20 vol. % of oxygen which is supplied into the intake pipe, the exhaust gas is preferably filtered using a filter 38 so as to remove particulates (such as soots) and water contained in the exhaust gas. An example of the filter 38 can be a conventional filter such as an active carbon filter, a membrane filter, or a bug filter.

When the cleaning method of the invention is performed with an engine mounted to a car, it is possible to process an exhaust gas in an exhaust gas-cleaning apparatus (catalyst apparatus) 35 to remove organic residues derived from the unburnt cleaning liquid, the burnt cleaning liquid and the engine oil.

In the cleaning procedure, the cleaning liquid and organic residue derived from the cleaning liquid in addition to the organic residue produced under the normal operation conditions (for instance, organic residues produced under the conventional operation of 2,000 rpm while the car is not driven) are supplied into the exhaust gas cleaning apparatus 35 mounted to the car 33. If an gas containing 20 vol. % or more of oxygen is supplied into the intake pipe under the above-mentioned conditions, the exhaust gas cleaning apparatus (catalyst apparatus) 35 receives an excessive amount of oxygen and is forced to oxidize the excessive amount of the organic residue. Therefore, the catalyst encased in the exhaust gas cleaning apparatus 35 can be overheated, as compared with the case under the normal condition.

Although the overheating of the catalyst not always disturbs the conditions of the catalyst, it naturally is not desired. If the oxygen content of the supplied gas is adjusted to be lower than 20 vol. % (particularly to an extremely lower level) according to the invention, the overheat of the catalyst can be obviated due to the less supply of oxygen even if a large amount of the organic material is brought into contact with the catalyst. Therefore, even if the gas containing less than 20 vol. % is supplied into the intake pipe at an increased rate so as to perform the cleaning procedure within a shorter period of time, the cleaning procedure can be smoothly performed with no careful observation of the overheat of the catalyst in the exhaust gas cleaning apparatus.

The organic residue escaped from the exhaust gas cleaning apparatus 35 of the car 33 is preferably removed in advance that it is released into air. The removal of the escaped residue can be performed by washing, absorption, burning, biological treatment, ozone treatment, photocatalyst treatment, plasma treatment, deodorant treatment, or dilution-diffusion treatment. In the embodiment of FIG. 3, the catalyst apparatus 39 in which the exhaust gas is burnt is used.

Figure 4:
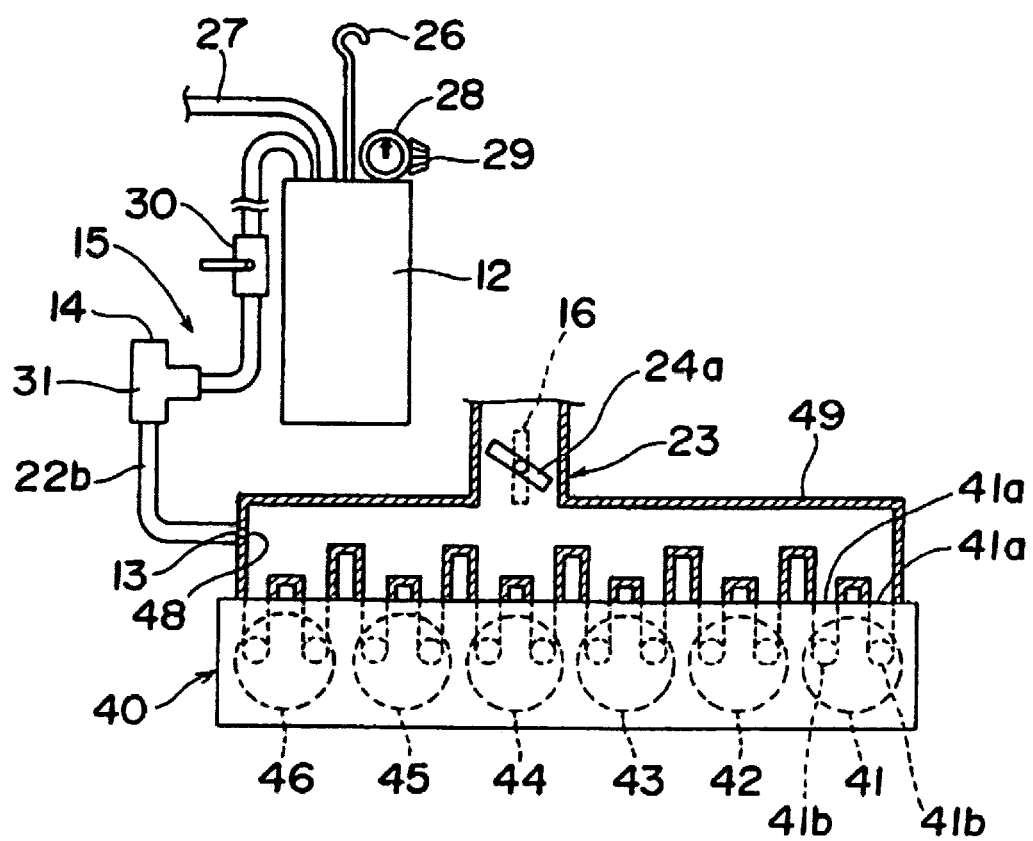
FIG. 4 illustrates another embodiment in which the cleaning method of the invention is performed for an engine mounted to a car.

FIG. 4 illustrates another embodiment of the invention in which the cleaning method is performed under such condition that the engine is mounted to a car. In the embodiment of FIG. 4, the cleaning procedure is performed in the same manner as in FIG. 3, except that the organic residue escaped from the exhaust gas cleaning apparatus 35 mounted to the car 33 is diluted with air in an exhaust gas treatment apparatus 40. The exhaust gas treatment apparatus 40 comprises a duct 41 having an inner diameter larger than the diameter of the tail pipe 36 of the car and a fan 42 for releasing the gas in the duct into air. The organic residue escaped from the exhaust gas clearing apparatus and exhausted from the tail pipe 36 of the car is mixed with air drawn into the duct 41 through a space between the tail pipe 36 and duct 41 and released into air.

EXAMPLES

The present invention is further described by the following examples.

Example 1

Figure 5:
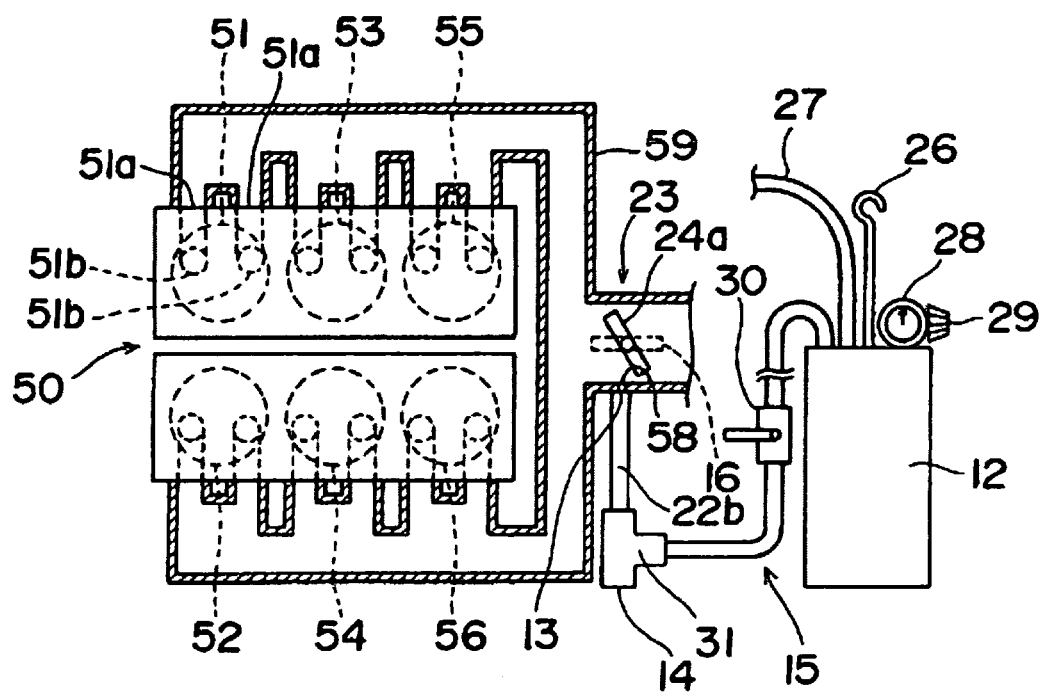
FIG. 5 schematically illustrates the gasoline engine to be cleaned and the apparatus for the cleaning.

FIG. 5 schematically illustrates the gasoline engine to be cleaned and the apparatus for the cleaning which were used in Example, Reference Example 1 and Reference Example 2. More particularly, in FIG. 5, the gasoline engine 50 is shown from the top. The gasoline engine 50 to be cleaned is a known V-type 6 cylinder gasoline engine having 6 cylinders 51, 52, 53, 54, 55 and 56. The engine 50 is mounted to a car (not shown) and has deposits (hydrocarbonaceous deposit, etc.) derived from the gasoline and engine oil in the engine because the car already has run approx. 40,000 km.

The gasoline engine 50 is equipped for each cylinder with two intake ports (for instance, the cylinder 51 is equipped with intake ports 51a, 51a, connected to the intake valves 51b, 51b. To the engine 50 is connected an intake pipe 59 having branches for supplying the engine fuel into each intake port. The intake pipe 59 has a port 58 at a position lower than the throttle valve attached position 16. The port 58 is provided on the intake pipe 59 for the connection with a canister purge hose.

The gasoline engine 50 having the above mentioned structure is subjected to the cleaning procedure in the below-described manner, without dismounting the engine from the car. The procedure is outlined below.

First, 650 mL of a cleaning liquid (effective components: dodecylphenoxy poly(oxybutylene)amine, 2-phenoxy-ethanol and propylene carbonate) was placed in the cleaning liquid storage tank 12. To the storage tank 12 was connected a gas supply tube 27 for supplying a compressed air into the storage tank 12. Then, the storage tank 12 was hung from the bonnet hood of the car using a hook 26. Subsequently, the cleaning liquid outlet 13 of the cleaning liquid supply pipe (resinous hose) 15 was connected airtightly to the port 58 of the intake pipe 59. Finally, the gas supply port 14 of the cleaning liquid supply pipe 15 and the tail pipe of the car is connected via a resinous hose 37.

The engine 50 was operated for 5 minutes at 2,500 rpm for warming, and then the rotation rate was changed to 2,000 rpm. As a result of the operation of the engine 50, the pressure inside of the intake pipe 59 was reduced. The temperature of the catalyst in the exhaust gas cleaning apparatus mounted to the car was 570° C. before the cleaning procedure was started.

While the engine was operated at 2,000 rpm, the valve 30 of the cleaning liquid supply pipe 15 was opened, whereby the cleaning liquid and the exhaust gas (containing less than 20 vol. % of oxygen) were simultaneously supplied from the cleaning liquid storage tank 12 and the gas supply port 14 of the cleaning liquid supply pipe 15, respectively, into the intake pipe 59 via the port 58. In this procedure, the pressure control valve 29 was operated to control the inner pressure of the storage tank 12 so as to adjust the rate of the cleaning liquid into the intake pipe to 30 mL/min.

Thus, the whole cleaning liquid and exhaust gas were continuously supplied into the intake pipe 59 under reduced pressure for approx. 22 minutes, thereby cleaning the inner parts of the engine. In this procedure, it was detected that the temperature of the catalyst in the exhaust gas cleaning apparatus was 620° C.

Finally, the valve 30 of the cleaning liquid supply pipe 15 was closed to terminate the supply of the cleaning liquid, but the engine was further operated for 5 minutes, whereby exhausting the cleaning liquid remaining in the engine 50 together with the exhaust gas. The evaluation of the cleaning effectiveness is outlined in Table 1.

Reference Example 1

The cleaning procedures outlined in Example 1 were repeated under the same conditions using the same V-type 6 cylinder gasoline engine which had therein deposits formed as a result of running for almost same kilometers, except that the resinous hose was disconnected from the gas supply port of the cleaning liquid supply pipe so as to draw air (oxygen concentration: 20.9 vol. %) into the intake pipe. The temperature of the catalyst in the exhaust gas cleaning apparatus mounted to the car measured before the cleaning procedure was started was almost the same as the temperature measured in Example 1. However, the temperature of the catalyst during the cleaning procedure increased to 700° C. The evaluation of the cleaning effectiveness is outlined in Table 1.

Reference Example 2

The cleaning procedures outlined in Example 1 were repeated under the same conditions using the same V-type 6 cylinder gasoline engine which had therein deposits formed as a result of running for almost same kilometers, except that the gas supply port of the cleaning liquid supply pipe was capped so as not to draw the exhaust (containing not less than 20 volume % of oxygen) gas into the intake pipe. The temperature of the catalyst in the exhaust gas cleaning apparatus mounted to the car measured before the cleaning procedure was started was almost the same as the temperature measured in Example 1. However, the temperature of the catalyst during the cleaning procedure decreased to 540° C. The evaluation of the cleaning effectiveness is outlined in Table 1.

Performance Evaluation of Cleaning Power

The performance of the cleaning effectiveness of Example 1, Reference Example 1 and Reference Example 2 were evaluated in the cleaning power in combustion chamber deposits and in intake port deposits.

(1) Evaluation of Cleaning Power in the Combustion Chamber

The ignition plug connected to each cylinder of the engine was removed prior to the start of the cleaning procedure. Subsequently, an industrial bore scope is inserted into the combustion chamber via the opening from which the ignition plug was removed to check the area of deposit (generally the deposit is formed on the whole inner surface of the combustion chamber) for each cylinder. When the cleaning procedure was complete, the cleaning power is evaluated by checking the area of deposit in the combustion chamber in the same manner and determining a ratio of the reduced deposit area (i.e., deposit-cleaning ratio). The cleaning power is evaluated using the following criteria:

AA: the reduced deposit area is 90% or more.
A: the reduced deposit area is 50% or more but less than 90%.
B: the reduced deposit area is 5% or more but less than 50%.
C: the reduced deposit area is less than 5%.

(2) Cleaning Power at the Intake Port

In advance of starting the cleaning procedure, the industrial bore scope is inserted into the intake pipe via the port of the intake pipe, to check the area of deposit formed on the inner surface of the intake pipe from the intake port to the intake valve (generally the deposit is formed on the whole inner surface of the intake pipe) for each cylinder. When the cleaning procedure was complete, the cleaning power is evaluated by checking the area of deposit on the inner surface of the intake pipe in the same manner and determining a ratio of the reduced deposit area (i.e., deposit-cleaning ratio). The cleaning power is evaluated in the same manner as that used for the evaluation of the cleaning power in the combustion chamber.

Results of Evaluation of Cleaning Power

The results of evaluation of cleaning power obtained in Example 1, Reference Example 1 and Reference Example 2 are set forth in the following Table 1, in which the each of the six cylinder number corresponds to that shown in FIG. 5.

TABLE 1

|  | 51 | 52 | 53 | 54 | 55 | 56 |
|---|---|---|---|---|---|---|
| Combustion Chamber |  |  |  |  |  |  |
| Example 1 | B | B | B | A | A | AA |
| Ref. Ex. 1 | B | B | B | A | A | AA |
| Ref. Ex. 2 | C | C | C | C | C | AA |
| Intake port |  |  |  |  |  |  |
| Example 1 | AA | AA | AA | AA | AA | AA |
| Ref. Ex. 1 | AA | AA | AA | AA | AA | AA |
| Ref. Ex. 2 | B | C | B | C | B | AA |

It is clear from the results of evaluation of the cleaning power, that the cleaning procedure of Example 1 performed according to the invention is advantageous, because the simple cleaning procedure according to the invention supplies small drops of the cleaning liquid into the intake pipe and the small drops are carried with the exhaust gas (containing less than 20 vol. % of oxygen) introduced into the intake pipe to reach a wide variety of the inner parts of the engine, whereby the inner parts of the engine can be satisfactorily cleaned. If it is desired to clean the inner parts of the engine more sufficiently, the period of supplying the cleaning liquid should be prolonged by placing an increased amount of the cleaning liquid in the storage tank.

In Example 1, the temperature of the catalyst in the exhaust gas cleaning apparatus mounted to the car increases only by 50° C., as compared with the temperature prior to the temperature prior to starting the cleaning procedure. This is in contract to the case of Reference Example 1, in which the temperature of the catalyst increases by 130° C., as compared with the temperature prior to the temperature prior to starting the cleaning procedure. Therefore, it is clear that the temperature increase of the catalyst in the cleaning procedure can be reduced if the cleaning procedure is performed according to the invention.

What is claimed is:

1. A method for cleaning internal parts of a gasoline engine, the method comprising the steps of:
   (1) connecting an outlet of a cleaning liquid supply pipe of a cleaning liquid storage tank containing a cleaning liquid airtightly to a port of an intake pipe of the gasoline engine, said cleaning liquid supply pipe having the outlet at its front end and a gas supply port thereon, said intake pipe having the port below a throttle valve-attached position thereof;
   (2) operating the engine to place the inside of the intake pipe under reduced pressure condition, and supplying continuously the cleaning liquid from the cleaning liquid storage tank to the inside of the intake pipe through the port positioned below the throttle valve-attached position thereof and simultaneously drawing continuously a gas having an oxygen concentration of less than 20 volume percent into the intake pipe via the gas supply port, wherein the gas having an oxygen concentration of less than 20 volume percent rapidly expands and the cleaning liquid turns into liquid drops such that the liquid drops are carried with the gas into the inside of the engine to bring the liquid drops of the cleaning liquid into contact with the internal parts of the engine, thereby cleaning the internal parts with the cleaning liquid; and
   (3) exhausting the cleaning liquid having been brought into contact with the internal parts of the engine with an exhaust gas of the engine.

2. The cleaning method of claim 1, in which the gas having an oxygen concentration of less than 20 volume percent contains an exhaust gas from an exhaust pipe of the engine.

3. The cleaning method of claim 2, in which the exhaust gas has been filtered to remove particulate.

4. The cleaning method of claim 1, in which the gas is selected having an oxygen content less than 15 volume percent.

5. The cleaning method of claim 4, in which the gas is selected having an oxygen content less than 10 volume percent.

6. The cleaning method of claim 1, which is performed with the engine mounted to a car.

7. The cleaning method of claim 1, which is performed with the engine mounted to a car, and wherein the car is in a stationary position.

* * * * *